United States Patent
Hoffmann

(10) Patent No.: US 10,532,700 B2
(45) Date of Patent: Jan. 14, 2020

(54) END SURFACE-NEUTRAL POSITIONING OF A CAMERA ON A VEHICLE

(71) Applicant: Bayerische Motoren Werke Aktiengesellschaft, Munich (DE)

(72) Inventor: Philipp Hoffmann, Odelzhausen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 171 days.

(21) Appl. No.: 15/677,104

(22) Filed: Aug. 15, 2017

(65) Prior Publication Data
US 2018/0009395 A1   Jan. 11, 2018

Related U.S. Application Data

(63) Continuation of application No. PCT/EP2016/053107, filed on Feb. 15, 2016.

(30) Foreign Application Priority Data

Feb. 16, 2015   (DE) .......................... 10 2015 202 743

(51) Int. Cl.
*B60R 11/04*   (2006.01)
*H04N 7/18*    (2006.01)

(52) U.S. Cl.
CPC ............ *B60R 11/04* (2013.01); *H04N 7/188* (2013.01); *B60R 2300/8046* (2013.01); *B60R 2300/8066* (2013.01)

(58) Field of Classification Search
CPC ............ B60R 11/04; B60R 2300/8046; B60R 2300/8066; H04N 7/188
See application file for complete search history.

(56) References Cited

U.S. PATENT DOCUMENTS

| | | | | |
|---|---|---|---|---|
| 5,760,828 A | * | 6/1998 | Cortes ....................... | B60R 1/00 348/143 |
| 7,424,387 B1 | * | 9/2008 | Gill ....................... | G01B 11/272 33/288 |
| 9,789,821 B2 | * | 10/2017 | Baur ......................... | B60R 1/00 |
| 2002/0167589 A1 | * | 11/2002 | Schofield ............... | B60N 2/002 348/148 |

(Continued)

FOREIGN PATENT DOCUMENTS

DE   10 2010 026 223 A1   5/2011
EP        0 711 681 A1   5/1996
(Continued)

OTHER PUBLICATIONS

UNECE Regulation No. 46, Official Journal of the European Union, Aug. 8, 2014.*

(Continued)

*Primary Examiner* — Courtney D Heinle
(74) *Attorney, Agent, or Firm* — Crowell & Moring LLP

(57) ABSTRACT

A method is provided for determining a position for a camera on an outer skin of a vehicle, the position being determined such that the camera can detect an object at a visual reference point behind the vehicle. The method identifies a lateral surface which, in an initial position, is parallel to an XZ plane of the vehicle at a lateral distance from a central x-axis of the vehicle, the lateral distance depending on a maximum width of the vehicle. The method identifies an axis of rotation for the lateral surface which is parallel to a z-axis of the vehicle and which extends through the visual reference point. The method determines a point of intersection of the lateral surface rotated, starting from the initial position, about the axis of rotation with the outer skin of the vehicle. The method determines the position for the camera based on the point of intersection.

13 Claims, 2 Drawing Sheets

(56) References Cited

U.S. PATENT DOCUMENTS

| | | | |
|---|---|---|---|
| 2005/0195383 A1* | 9/2005 | Breed | B60N 2/002 356/4.01 |
| 2007/0109408 A1* | 5/2007 | Watanabe | B60R 1/00 348/148 |
| 2008/0046150 A1* | 2/2008 | Breed | B60R 21/0134 701/45 |
| 2012/0133768 A1* | 5/2012 | Stephan | B60R 1/00 348/148 |
| 2014/0043473 A1* | 2/2014 | Gupta | H04N 17/00 348/135 |
| 2014/0139674 A1* | 5/2014 | Aoki | H04N 7/18 348/148 |
| 2014/0226008 A1* | 8/2014 | Lang | H04N 7/183 348/148 |
| 2014/0333729 A1* | 11/2014 | Pflug | G06T 15/20 348/47 |
| 2014/0347469 A1* | 11/2014 | Zhang | B60R 1/00 348/118 |
| 2015/0343950 A1* | 12/2015 | Heinemann | B60R 1/00 348/148 |
| 2016/0094808 A1* | 3/2016 | Cerri | B60R 1/00 348/36 |
| 2018/0086284 A1* | 3/2018 | Gupta | G03B 43/00 |

FOREIGN PATENT DOCUMENTS

| | | |
|---|---|---|
| EP | 2 736 013 A2 | 5/2014 |
| EP | 2 765 031 A1 | 8/2014 |
| WO | WO 2005/039926 A2 | 5/2005 |
| WO | WO 2011/014903 A1 | 2/2011 |
| WO | WO 2014/094941 A1 | 6/2014 |

OTHER PUBLICATIONS

UNECE, "Regelung Nr. 46 der Wirtschaftskommision der Vereinten Nationen fuer Europa (UNECE)—Einheitliche Bedingungen fuer die Genehmigung von Einrichtungen fuer indirekte Sicht und von Kraftfahrzeugen hindsichtlich der Anbringung solcher Einrichtug", Amtsblatt der Europaischen Union, Aug. 8, 2014, pp. L 237/24-L 237/77, XP055284838.

ESSER, "Standardization and Vehicle Regulation Aspects of Camera Monitor Systems", Handbook of Camera Monitor Systems, Mar. 10, 2016, pp. 51-100, Springer International Publishing, Switzerland, XP055284843.

German-language Search Report issued in counterpart German Application No. 10 2015 202 743.0 dated Jan. 14, 2016 with partial English translation (12 pages).

International Search Report (PCT/ISA/210) issued in PCT Application No. PCT/EP2016/053107 dated Jul. 7, 2016 with English translation (7 pages).

German-language Written Opinion (PCT/ISA/237) issued in PCT Application No. PCT/EP2016/053107 dated Jul. 7, 2016 (7 pages).

* cited by examiner

END SURFACE-NEUTRAL POSITIONING OF A CAMERA ON A VEHICLE

CROSS REFERENCE TO RELATED APPLICATIONS

This application is a continuation of PCT International Application No. PCT/EP2016/053107, filed Feb. 15, 2016, which claims priority under 35 U.S.C. § 119 from German Patent Application No. 10 2015 202 743.0, filed Feb. 16, 2015, the entire disclosures of which are herein expressly incorporated by reference.

BACKGROUND AND SUMMARY OF THE INVENTION

The invention relates to a method for positioning a camera on the outer skin of a vehicle such that the camera is able to capture a road space lying laterally next to and/or behind the vehicle.

A vehicle (in particular a road vehicle such as, e.g., an automobile) typically has one or more outer mirrors which allow a driver of the vehicle to see a lateral environment and/or a rearward environment of the vehicle. For the purposes of reducing the end surface of the vehicle, the outer mirrors can be replaced by one or more cameras and the video data captured by the cameras can be reproduced on a screen in the interior of the vehicle. What should be ensured when use is made of one or more cameras is that the one or more cameras are able to capture at least the environment of the vehicle which can also be seen by the conventional outer mirrors of a vehicle.

The present document considers the technical problem of placing one or more cameras for capturing a lateral and rearward environment of a vehicle onto the outer skin of the vehicle in such a way that the one or more cameras do not bring about any increase, or only the smallest possible increase, in the end surface of the vehicle and that a predefined region of the environment of the vehicle can be captured by the one or more cameras. This allows a high degree of safety to be maintained and an aerodynamic resistance of the vehicle to be reduced (possibly minimized).

The problem is solved by providing a method for determining a position for a camera on an outer skin of a vehicle. The position should be ascertained in such a way that the camera can capture an object at a visual reference point behind the vehicle in the direction of travel. The method comprises ascertaining a lateral area which, in an initial position parallel to an XZ-plane of the vehicle, extends at a lateral distance from a central X-axis of the vehicle. The lateral distance depends on a maximum width of the vehicle. Moreover, the method comprises ascertaining an axis of rotation for the lateral area, which extends parallel to a Z-axis of the vehicle and which extends through the visual reference point. Moreover, the method comprises determining a point of intersection between the lateral area, which, proceeding from the initial position, has been rotated about the axis of rotation, and the outer skin of the vehicle. The position for the camera can then be determined depending on the point of intersection.

A vehicle (e.g. an automobile) is described in accordance with a further aspect. The vehicle comprises a camera configured to capture an object at a visual reference point behind the vehicle in the direction of travel, wherein the camera is arranged at a position on an outer skin of the vehicle which emerges from the method described in this document. In particular, the position of the camera could have been established using the method described in this document.

A software (SW) program (e.g. a computer-aided design [CAD] program) is described in accordance with a further aspect. The SW program can be configured to be carried out on a processor (e.g. on a control unit) and to carry out the method described in this document as a result thereof.

A storage medium is described in accordance with a further aspect. The storage medium can comprise an SW program which is configured to be carried out on a processor and to carry out the method described in this document as a result thereof.

It should be noted that the methods, apparatuses and systems described in this document can be used both on their own and in combination with other methods, apparatuses and systems described in this document. Furthermore, all aspects of the methods, apparatus and systems described in this document can be combined with one another in various ways. In particular, the features of the claims can be combined with one another in various ways.

Other objects, advantages and novel features of the present invention will become apparent from the following detailed description of one or more preferred embodiments when considered in conjunction with the accompanying drawings.

DETAILED DESCRIPTION OF THE DRAWINGS

As presented at the outset, the present document considers the positioning of one or more cameras on the outer skin of a vehicle. Here, the one or more cameras should be configured to adopt the function of a conventional outer mirror of the vehicle. In particular, the one or more cameras should be configured to capture a lateral environment and/or a rearward environment of the vehicle. Furthermore, the positioning of the one or more cameras should be carried out in such a way that an additional end surface of the vehicle, required for the one or more cameras, is minimized.

Figure 1:
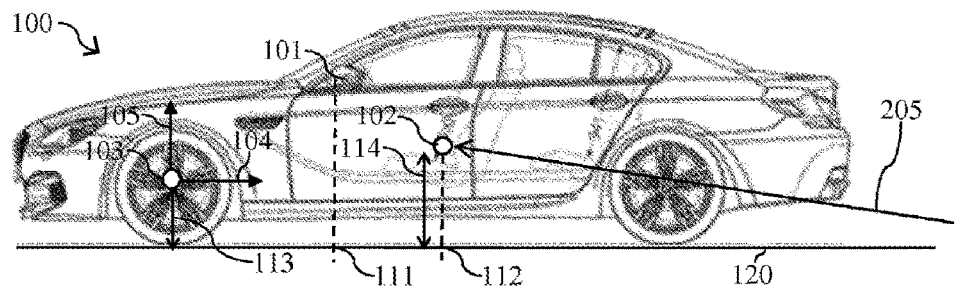
FIG. 1 shows an exemplary vehicle in a side view.

FIG. 1 shows a side view of an exemplary vehicle 100. It is possible to define a coordinate system for the vehicle 100 so as to be able to describe the position of components of the vehicle 100. By way of example, an origin of the coordinate system can be arranged at a front axle of the vehicle 100, in particular at a center point of the front axle, centrally between a right front wheel and a left front wheel of the vehicle 100. Such a coordinate system is presented in FIG. 1, with an X-axis 104 in the longitudinal direction in relation to the vehicle 100, with a Y-axis 103 transversely to the vehicle 100 (horizontally) and with a perpendicular Z-axis 105.

The Y-axis 103 has a distance 113 from an area 120 on which the vehicle 100 stands. The distance 113 depends on the load of the vehicle 100. In the case of an unloaded vehicle 100 (e.g. in the case of a so-called measuring load 1), the distance 113 is at a maximum, in the case of a typically loaded vehicle 100 (e.g. in the case of a so-called measuring load 2), the distance 113 is reduced, and in the case of a fully loaded vehicle (e.g. in the case of a so-called measuring load 3), the distance 113 is minimal.

The vehicle 100 typically has an outer mirror 101, wherein a straight line extending perpendicularly downward from the outer mirror 101 intersects the area 120 at a point 111. Furthermore, a seat reference point 102 is typically specified for a vehicle 100; it indicates the typical position of a driver of the vehicle 100. By way of example, the seat reference point 102 can correspond to a typical position of the hip of a driver. A straight line extending perpendicularly downward from the seat reference point 102 intersects the plane 120 at a point 112.

In a manner analogous to the distance 113 of the front axle, the seat reference point 102 of the vehicle 100 also has a distance 114 from the area 120 which depends on the load in the vehicle 100. Moreover, it should be noted that the angle between the area 120 and the X-axis 104 may change, depending on the load in the vehicle 100. In particular, this may be due to a different suspension of the front axle and of the rear axle of the vehicle 100.

All visual fields required for the driver can be provided by a panoramic image which is captured by at least one camera on the outer skin of the vehicle 100. Here, provision should also be made of statutory minimum visual fields, in particular pursuant to ECE-R46. The panoramic image is captured by at least one camera which is arranged at an advantageous point on the vehicle 100 and which replaces one or more mirrors 101 of the vehicle 100 (in particular a side mirror 101 and optionally an inner mirror).

Figure 2A:
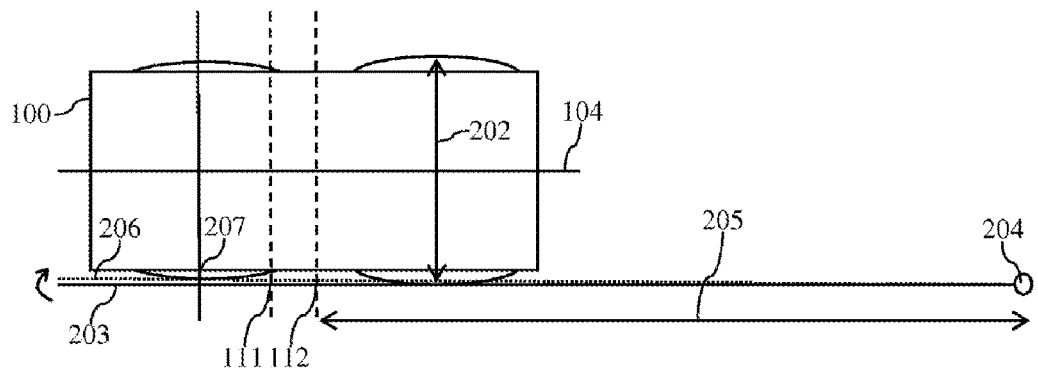
FIG. 2A shows exemplary aspects in relation to the positioning of a camera.

An exemplary method for ascertaining a positioning point for a camera is described below with reference to FIGS. 2A and 2B. The area 120 (e.g. for the measuring load 2) can be extended behind the vehicle 100 up to a visual reference point 204 such that the visual reference point 204 has a predefined distance 205 from the seat reference point 102. The distance 205 between the seat reference point 102 and the visual reference point 204 is also presented in FIG. 1. In particular, the predefined distance 205 can emerge from a statutory requirement (e.g. ECE-R46). An exemplary value of the predefined distance is 4 meters.

It is then possible to determine a lateral area 203 parallel to the XZ-plane 203 of the vehicle 100, said lateral area having exactly half the distance of the maximum vehicle width 202 from the X-axis 104. This lateral area 203 (parallel to the XZ-plane) intersects the area 120 (parallel to the XY-plane) at, inter alia, the visual reference point 204. In particular, the visual reference point 204 is the point of intersection between the area 203 and area 120, which is situated at the predefined distance 205 from the seat reference point 102. An axis of rotation RA extending in the Z-direction through the visual reference point 204 can be used to rotate the lateral area 203.

The lateral area 203 can be rotated about the axis of rotation RA toward the vehicle 100 until the resultant rotational area 206 (i.e. until the rotated lateral area) begins to intersect the outer skin of the vehicle 100 (e.g. at the point of intersection 207). Here, typically, only a small rotation (e.g. of −0.3°) of the lateral area 203 is required when proceeding from the initial position (in which the lateral area 203 extends parallel to the XZ-plane). The point of intersection 207 can be used for positioning the camera. In particular, the camera can be positioned at the point of intersection 207 on the outer skin of the vehicle 100.

By way of the described method for ascertaining the point of intersection 207, it is possible to ensure that the enlargement of the end surface of the vehicle 100 that is required for a camera can be reduced (optionally minimized). Moreover, it is possible to ensure that requirements in respect of the visibility of an object which is situated at the visual reference point 204 continue to be (at least partly) satisfied.

It is possible to consider one or more constraints when ascertaining the point of intersection 207. Exemplary constraints are:

(1) The condition that the point of intersection 207 lies at a certain distance in front of the current position 111 of an outer mirror 101 (in the direction of travel). Here, the determined distance may depend on an aperture angle of the camera which is placed at the point of intersection 207.

(2) The condition that a camera placed on the point of intersection 207 renders it possible to capture a certain predefined region in the lateral environment of the vehicle 100. This condition typically depends on the aperture angle of the camera.

(3) The condition that enough installation space to place the camera in the vehicle 100 is available at the ascertained point of intersection 207.

Figure 2B:
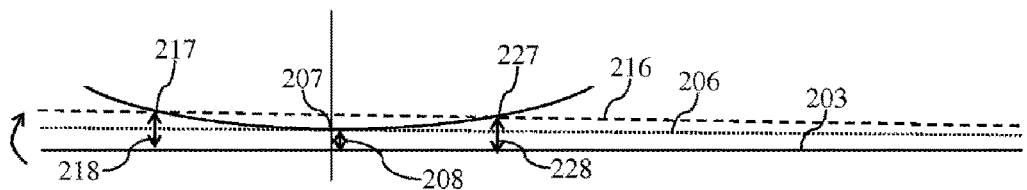
FIG. 2B shows a magnified section of FIG. 2A.
Figure 3:
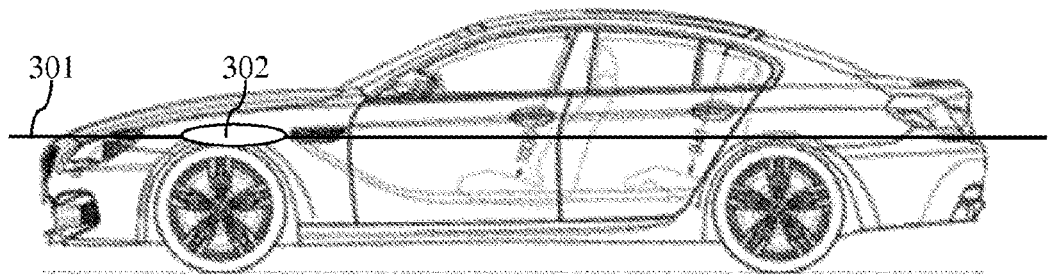
FIG. 3 shows exemplary regions for positioning a camera.

FIG. 2B shows exemplary points of intersection 217, 227 which can be ascertained taking into account one or more constraints. Proceeding from the first point of intersection 207, the lateral area 203 can be rotated further about the axis of rotation RA (see rotational area 216) until a point of intersection 217, 227 which satisfies the one or more constraints is ascertained. Therefore, it is possible to ascertain a region 302 (see FIG. 3), in or on which the camera can be positioned taking into account one or more constraints.

In an alternative or complementary manner, it is possible to determine a horizontal area 301 which extends parallel to the XY-plane of the vehicle 100 and which lies level with the point of intersection 207 in the Z-direction. The camera can be positioned at the point of intersection 207 or at a point of the outer skin of the vehicle 100 lying on the horizontal area 301. The point lying on the horizontal area 301 can be ascertained under the constraint that sufficient installation space is available for placing the camera (e.g. a minimum distance of approximately 5 mm from the further components of the vehicle 100).

The camera can be arranged with a specific orientation at the determined position on the outer skin of the vehicle 100. The rotation of the camera in space about the Z-axis can be exactly half of the aperture angle. In one example, the camera can be arranged in such a way that a first delimitation of the lateral (horizontal) capturing region of the camera extends parallel to the X-axis 104 of the vehicle 100 or extends by 5° or fewer degrees in the direction of the body of the vehicle 100. The second delimitation of the lateral (horizontal) capturing region of the camera can then extend away from the body of the vehicle 100. As a result, the camera can capture a view of the lateral environment of the vehicle 100 which is as large as possible.

FIG. 2B moreover shows a distance 208, 218, 228 between the respective point of intersection 207, 217, 227 and the lateral area 203. By way of a camera placed on the lateral area 203, it is possible to ensure that the camera can capture an object at the visual reference point 204 past the body of the vehicle 100. In the case of a camera placed at a distance 208, 218, 228 from the lateral area 203 (in the direction of the vehicle 100), such an object at the visual reference point 204 may be covered by the body of the vehicle 100. It may therefore be advantageous to place the camera at a lateral distance 208, 218, 228 from the point of intersection 207, 217, 227 (away from the vehicle 100) in order to ensure that the camera can capture an object at the visual reference point 204. The method described in this document ensures that this distance 208, 218, 228, and hence the required enlargement of the end surface of the vehicle 100, is minimal.

In an alternative or complementary manner, a connecting line can be drawn between the visual reference point 204 and an inner point on the radius of the objective of the camera on the vehicle-facing side for the purposes of monitoring the meeting of the requirement of a minimum visual field of the camera. If this connecting line intersects the body, it may be necessary to place the camera at a certain distance 208, 218, 228 from the point of intersection 207, 217, 227 (away from the vehicle 100).

Figure 4:
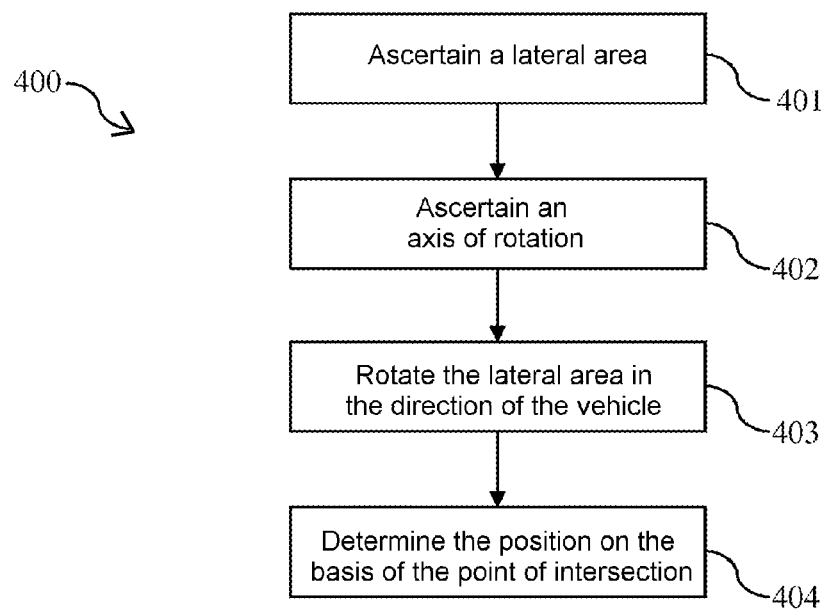
FIG. 4 shows a flowchart of an exemplary method for positioning a camera on the outer skin of a vehicle.

FIG. 4 shows a flowchart of an exemplary method 400 for determining a position for a camera on an outer skin of a vehicle 100. The position of the camera should be determined in such a way that the camera can capture an object at a visual reference point 204 behind the vehicle 100 (in the direction of travel). The visual reference point 204 can be arranged at a predefined reference distance 205 behind the seat reference point of the vehicle 100 (in the direction of travel). Here, the seat reference point depends on a seat position of the vehicle 100 for a driver of the vehicle 100. Typically, the visual reference point 204 and, in particular, the predefined reference distance 205 depend on a statutory requirement, in particular the regulation ECE-R46.

The method 400 comprises ascertaining 401 a lateral area 203 which, in an initial position, extends parallel to an XZ-plane of the vehicle 100. By way of example, the XZ-plane can divide the vehicle 100 into a left half and a right half (in relation to the direction of travel of the vehicle 100). In a Cartesian coordinate system of the vehicle 100, the XZ-plane can assume the value of 0 on a Y-axis 103. The Y-axis 103 can extend from left to right (in relation to the direction of travel of the vehicle 100) transversely through the vehicle 100 (e.g. along a front axle of the vehicle 100).

The lateral area 203 extends at a lateral distance from a central X-axis 104 of the vehicle 100, with the lateral distance depending on a maximum width 202 of the vehicle 100. Here, the maximum width 202 typically does not comprise the width of possible outer mirrors 101 of the vehicle 100. In particular, the lateral distance can correspond to half the maximum width 202 of the vehicle 100. The X-axis 104 can extend from front to back through the vehicle 100 (in relation to the direction of travel). Hence, the lateral surface 203 can contact the outer skin of the vehicle 100 at the widest position of the vehicle 100. The widest position of the vehicle 100 can be arranged in a rearward region of the vehicle 100 (e.g. over the rear wheels of the vehicle 100). Such a position in the rear region of the vehicle 100 is typically unsuitable for positioning a camera since a lateral environment of the vehicle 100 can usually only be captured insufficiently at such a position.

The method 400 further comprises ascertaining 402 an axis of rotation for the lateral area 203, with the axis of rotation extending parallel to a Z-axis 105 of the vehicle 100 and with the axis of rotation extending through the visual reference point 204. Moreover, the axis of rotation typically lies within the lateral area 203. In particular, the visual reference point 204 typically lies within the lateral area 203. The Z-axis 105 of the vehicle 100 can extend perpendicular from bottom to top through the vehicle 100.

Moreover, the method 400 comprises determining 403 a point of intersection 207, 217, 227 between the lateral area 206, 216, which, proceeding from the initial position, has been pivoted about the axis of rotation, and the outer skin of the vehicle 100. Expressed differently, the lateral area 203 can be rotated about the axis of rotation starting from the initial position (in which the lateral area 203 extends parallel to the XZ-plane of the vehicle 100), in particular in the direction of the outer skin of the vehicle 100. In the process, a point of intersection 207, 217, 227 arises between the rotated lateral area 206, 216 and the outer skin of the vehicle 100. The position for the camera can then be determined depending on the point of intersection 207, 217, 227 (step 404). In particular, the position for the camera can correspond to the determined point of intersection 207, 217, 227.

The method 400 renders it possible to determine a position for an external camera of the vehicle 100, by means of which the end surface of the vehicle 100 that is required for the camera can be minimized and by means of which, furthermore, a line of sight between the camera and the visual reference point 204 can be ensured.

The point of intersection 207, 217, 227 can be determined in such a way that the point of intersection 207, 217, 227 satisfies one or more constraints. The one or more constraints can comprise the condition that the point of intersection 207, 217, 227 is arranged in front of the seat reference point of the vehicle 100 in the direction of travel of the vehicle 100. In an alternative or complementary manner, the one or more constraints can comprise the condition that the camera, which has a predefined aperture angle, is able to capture, at the position that is determined on the basis of the point of intersection 207, 217, 227, a predefined region of a lateral environment of the vehicle 100. In an alternative or complementary manner, the one or more constraints can comprise the condition that the camera, which has a predefined aperture angle, is able to capture, at the position that is determined on the basis of the point of intersection 207, 217, 227, the same region of a lateral environment of the vehicle 100 as an outer mirror 101 of the vehicle 100. In an alternative or complementary manner, the one or more constraints can comprise the condition that the vehicle 100 has available installation space for receiving the camera at the position that is determined on the basis of the point of intersection 207, 217, 227.

By taking into account one or more constraints, the determined position for the camera is able to satisfy further requirements that are relevant for a replacement of an outer mirror function, in addition to a reduction in the end surface of the vehicle 100.

Determining 404 the position for the camera can comprise determining a lateral distance from the point of intersection 207, 217, 227 along the Y-axis 103 of the vehicle 100 such that at least one line of sight exists between the camera and the visual reference point 204.

In particular, determining 404 the position for the camera can comprise determining an end surface distance 208, 218, 228 between the point of intersection 207, 217, 227 and the lateral area 203 in the initial position. Expressed differently, it is possible to ascertain how far the point of intersection 207, 217, 227 is away from the (non-rotated) lateral surface 203. The position for the camera can then also be determined depending on the end surface distance 208, 218, 228 between the point of intersection 207, 217, 227 and a (non-rotated) lateral area 203. By way of example, the camera can be positioned at a point which lies on the lateral area 203 in the initial position and which is situated at the end surface distance 208, 218, 228 from the point of intersection 207, 217, 227. This renders it possible to ensure that a minimal end surface arises from the position of the camera and that, at the same time, a line of sight exists between the camera and the visual reference point 204.

In an alternative or complementary manner, determining 404 the position for the camera can comprise determining a horizontal area 301 which extends parallel to an XY-plane of the vehicle 100 and which passes through the point of intersection 207, 217, 227. The XY-plane of the vehicle can divide the vehicle 100 into an upper half and a lower half. It is then possible to ascertain a further point of intersection between the horizontal area 301 and the outer skin of the vehicle 100. This further point of intersection can be ascertained in such a way that the further point of intersection satisfies one or more of the aforementioned constraints. The position for the camera can then be determined depending on the further point of intersection.

The method 400 may further comprise determining a horizontal distance 114 between an area 120 on which the vehicle 100 stands and the seat reference point of the vehicle 100. Here, the horizontal distance 114 depends typically on a load of the vehicle 100 (e.g. on a so-called measuring load 2). Moreover, the method 400 can comprise determining the visual reference point 204 depending on the horizontal distance 114 and/or depending on the load of the vehicle 100. By taking into account the load of the vehicle 100, it is possible to determine the position for the camera with an increased accuracy.

Thus, this document describes a vehicle 100 with a camera which is configured to capture an object at a visual reference point 204 behind the vehicle 100 in the direction of travel. The visual reference point 204 is typically arranged within the aforementioned lateral area 203 (in particular if the lateral area 203 is situated in the initial position). Here, the camera is arranged at a position on the outer skin of the vehicle 100 which emerges from the method 400 described in this document. The vehicle 100 typically has no outer mirrors. Instead, information about the lateral environment and rearward environment of the vehicle 100 is provided by the camera.

As a result of the described measures, it is possible to realize end surface-neutral positioning of a camera in the outer skin of a vehicle 100. Expressed differently, a camera can be positioned in such a way that the camera cannot be seen from the front. Hence, it is possible to avoid (or reduce) an end surface increase in relation to the basic body of the vehicle 100. As a result, the delta of the air resistance coefficient on the overall vehicle 100 on account of the camera remains close to zero in the case of a suitable configuration of a camera housing. Moreover, the function of the outer mirror 101 is no longer required on account of the camera, and so the one or more outer mirrors 101 of the vehicle 100 can be dispensed with. Hence, the air resistance coefficient can be optimized further on the overall vehicle 100 when an outer mirror 101 is eliminated. The average aerodynamic advantage may lie up to 8% in the case of an ideal configuration. Moreover, the field of view of the driver can be extended by the provision of a panoramic image, leading to an increase of the safety of the vehicle 100.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining a position for a camera on an outer skin of a vehicle such that the camera can capture an object at a visual reference point behind the vehicle, the method comprising:
    ascertaining a lateral area which, in an initial position parallel to an XZ-plane of the vehicle, extends at a lateral distance from a central X-axis of the vehicle, wherein the lateral distance depends on a maximum width of the vehicle;
    ascertaining an axis of rotation for the lateral area, which extends parallel to a Z-axis of the vehicle and which extends through the visual reference point;
    determining a point of intersection between the lateral area, which, proceeding from the initial position, has been rotated about the axis of rotation, and the outer skin of the vehicle;
    determining the position for the camera depending on the point of intersection; and
    installing the camera on the vehicle at the point of intersection.

2. The method as claimed in claim 1, wherein
    the lateral distance corresponds to half the maximum width of the vehicle excluding outside mirrors.

3. The method as claimed in claim 1, wherein
    the visual reference point is arranged at a predefined reference distance behind a seat reference point of the vehicle; and
    the seat reference point depends on a seat position of the vehicle for a driver of the vehicle.

4. The method as claimed in claim 1, wherein
    the point of intersection is determined such that the point of intersection satisfies one or more of the following constraints:
    (a) a condition that the point of intersection is arranged in front of a seat reference point of the vehicle in the direction of travel of the vehicle;
    (b) a condition that the camera, which has a predefined aperture angle, is able to capture, at the position that is determined on the basis of the point of intersection, a predefined region of a lateral environment of the vehicle;
    (c) a condition that the camera, which has a predefined aperture angle, is able to capture, at the position that is determined on the basis of the point of intersection, the same region of a lateral environment of the vehicle as an outer mirror of the vehicle; and
    (d) a condition that the vehicle has available installation space for receiving the camera at the position that is determined on the basis of the point of intersection.

5. The method as claimed in claim 1, wherein the step of determining the position for the camera comprises:
    determining an end surface distance between the point of intersection and the lateral area in the initial position; and
    determining the position for the camera also depending on the end surface distance.

6. The method as claimed in claim 5, wherein the step of determining the position for the camera comprises:
    ascertaining a lateral distance from the point of intersection along a Y-axis of the vehicle such that there is at least a line of sight between the camera and the visual reference point.

7. The method as claimed in claim 1, wherein the step of determining the position for the camera comprises:
    ascertaining a lateral distance from the point of intersection along a Y-axis of the vehicle such that there is at least a line of sight between the camera and the visual reference point.

8. The method as claimed in claim 6, wherein the step of determining the position for the camera comprises:
    ascertaining a horizontal area which extends parallel to an XY-plane of the vehicle and which passes through the point of intersection;

ascertaining a further point of intersection of the horizontal area with the outer skin of the vehicle; and
determining the position for the camera depending on the further point of intersection.

9. The method as claimed in claim 1, wherein the step of determining the position for the camera comprises:
    ascertaining a horizontal area which extends parallel to an XY-plane of the vehicle and which passes through the point of intersection;
    ascertaining a further point of intersection of the horizontal area with the outer skin of the vehicle; and
    determining the position for the camera depending on the further point of intersection.

10. The method as claimed in claim 1, wherein the method further comprises:
    determining a vertical distance between an area on which the vehicle stands and a seat reference point of the vehicle, wherein the vertical distance depends on a load of the vehicle; and
    determining the visual reference point depending on the vertical distance.

11. The method as claimed in claim 8, wherein the method further comprises:
    determining a vertical distance between an area on which the vehicle stands and a seat reference point of the vehicle, wherein the vertical distance depends on a load of the vehicle; and
    determining the visual reference point depending on the vertical distance.

12. A vehicle, comprising:
    a camera configured to capture an object at a visual reference point behind the vehicle in a direction of travel; and
    a processor executing a program stored in a memory, the program causing the processor to:
        ascertain a lateral area which, in an initial position parallel to an XZ-plane of the vehicle, extends at a lateral distance from a central X-axis of the vehicle, wherein the lateral distance depends on a maximum width of the vehicle;
        ascertain an axis of rotation for the lateral area, which extends parallel to an Z-axis of the vehicle and which extends through the visual reference point;
        determine a point of intersection between the lateral area, which, proceeding from the initial position, has been rotated about the axis of rotation, and the outer skin of the vehicle; and
        determine the position for the camera depending on the point of intersection;
    wherein the camera is installed on the vehicle at the point of intersection determined by the processor.

13. The vehicle as claimed in claim 12, wherein the vehicle has no outer mirror.

* * * * *